(12) United States Patent
Kyoya et al.

(10) Patent No.: US 10,820,132 B2
(45) Date of Patent: Oct. 27, 2020

(54) VOICE PROVIDING DEVICE AND VOICE PROVIDING METHOD

(71) Applicants: YAMAHA CORPORATION, Hamamatsu-shi, Shizuoka (JP); FUJITSU LIMITED, Kawasaki-shi, Kanagawa (JP)

(72) Inventors: Miho Kyoya, Kawasaki (JP); Mitsuki Arita, Hamamatsu (JP); Ikuro Ohshima, Hamamatsu (JP); Hiroki Uchida, Ota-ku (JP); Hiroaki Sugimura, Ota-ku (JP); Yukio Tada, Iwata (JP)

(73) Assignees: Yamaha Corporation, Hamamatu-shi (JP); Fujitsu Limited, Kawasaki-shi (JP)

( * ) Notice: Subject to any disclaimer, the term of this patent is extended or adjusted under 35 U.S.C. 154(b) by 0 days.

(21) Appl. No.: 16/597,394

(22) Filed: Oct. 9, 2019

(65) Prior Publication Data

US 2020/0037098 A1    Jan. 30, 2020

Related U.S. Application Data

(63) Continuation of application No. PCT/JP2018/011554, filed on Mar. 22, 2018.

(30) Foreign Application Priority Data

Apr. 10, 2017    (JP) .................... 2017-077348

(51) Int. Cl.
*H04S 7/00* (2006.01)
*H04S 3/00* (2006.01)
*A63J 19/00* (2006.01)

(52) U.S. Cl.
CPC .............. *H04S 7/303* (2013.01); *H04S 3/008* (2013.01); *A63J 19/006* (2013.01); *H04S 2400/01* (2013.01); *H04S 2400/11* (2013.01)

(58) Field of Classification Search
CPC ...... H04S 7/303; H04S 3/008; H04S 2400/01; H04S 2400/11; A63J 19/006
See application file for complete search history.

(56) References Cited

U.S. PATENT DOCUMENTS

2012/0314871 A1* 12/2012 Koga ...................... H04S 7/304
                                                              381/17
2018/0048976 A1*  2/2018 Kimura ............. H04M 3/42365

FOREIGN PATENT DOCUMENTS

| JP | 2001-238266 A | 8/2001 |
|----|---------------|--------|
| JP | 2007-248162 A | 9/2007 |
| WO | WO 2016/185740 A1 | 11/2016 |

OTHER PUBLICATIONS

International Search Report (PCT/ISA/210) issued in PCT Application No. PCT/JP2018/011554 dated May 29, 2018 with English translation (four (4) pages).

(Continued)

*Primary Examiner* — Andrew L Sniezek
(74) *Attorney, Agent, or Firm* — Crowell & Moring LLP (57) ABSTRACT

A voice providing method includes obtaining position information from a voice reproducing device, and performing processing, in a case in which a first position of obtained position information and a second position of a virtual talker are in a predetermined relationship, to cause the voice reproducing device to reproduce voice for the virtual talker to have a dialogue with a user with content according to the user.

16 Claims, 7 Drawing Sheets

(56) References Cited

OTHER PUBLICATIONS

Japanese-language Written Opinion (PCT/ISA/237) issued in PCT Application No. PCT/JP2018/011554 dated May 29, 2018 (five (5) pages).

* cited by examiner

|  |  | POSITION INFORMATION |
|---|---|---|
| USER ID | U001 | ... |
|  | U002 | ... |
|  | U003 | ... |
|  | ... | ... |
|  | ... | ... |
| VIRTUAL TALKER ID | G001 | ... |
|  | G002 | ... |
|  | G003 | ... |
|  | ... | ... |
|  | ... | ... |

FIG.5

FIG.7

VOICE PROVIDING DEVICE AND VOICE PROVIDING METHOD

CROSS REFERENCE TO RELATED APPLICATIONS

This application is a continuation of International Application No. PCT/JP2018/011554, which was filed on Mar. 22, 2018 based on Japanese Patent Application (No. 2017-077348) filed on Apr. 10, 2017, the contents of which are incorporated herein by reference.

BACKGROUND OF THE INVENTION

1. Field of the Invention

A preferred embodiment of the present invention relates to a technology for providing voice to a user.

2. Description of the Related Art

A technology to provide a user with information corresponding to the position of the user has been known. For example, Japanese Unexamined Patent Application Publication No. 2001-238266 discloses that, when an advertisement of a facility or a store is distributed, information to be distributed is switched according to a distance between the facility or the store and a mobile terminal carried by a user.

A voice providing method according to a preferred embodiment of the present invention includes obtaining position information from a voice reproducing device, and performing processing, in a case in which a first position of obtained position information and a second position of a virtual talker are in a predetermined relationship, to cause the voice reproducing device to reproduce voice for the virtual talker to have a dialogue with a user with content according to the user.

DETAILED DESCRIPTION OF THE PREFERRED EMBODIMENTS

An object of a preferred embodiment of the present invention is not to merely provide information in a conventional manner but is to achieve communication by voice between a virtual talker such as a character of an amusement facility, for example, and a user.

A voice providing method according to a preferred embodiment of the present invention includes obtaining position information from a voice reproducing device, and performing processing, in a case in which a first position of obtained position information and a second position of a virtual talker are in a predetermined relationship, to cause the voice reproducing device to reproduce voice for the virtual talker to have a dialogue with a user with content according to the user.

According to a preferred embodiment of the present invention, communication by voice between a virtual talker and a user is able to be achieved.

The performing may include performing processing to cause the voice reproducing device to reproduce, along with reproduction of the voice, a predetermined sound field according to a relationship between the first position and the second position.

The performing may include performing processing to reproduce the voice in a case in which the first position and the second position are within a predetermined range.

The performing may include performing processing to reproduce the voice in a case in which the first position and the second position are within a range of a predetermined distance and the position of the virtual talker is present in a direction to which the user faces.

The performing may include performing processing to change the content of the voice according to a distance between the first position and the second position.

The performing may include performing processing to reproduce the voice for the virtual talker to have a dialogue with the user with content according to an attribute, behavior, biological information, or feeling of the user.

The voice providing method may include updating the second position.

The updating may include updating the second position according to congestion status of each area.

The updating may include updating the second position according to status of service to be provided in each area.

The updating may include updating the second position according to movement status of the user who is having a dialogue with the virtual talker.

Figure 1:
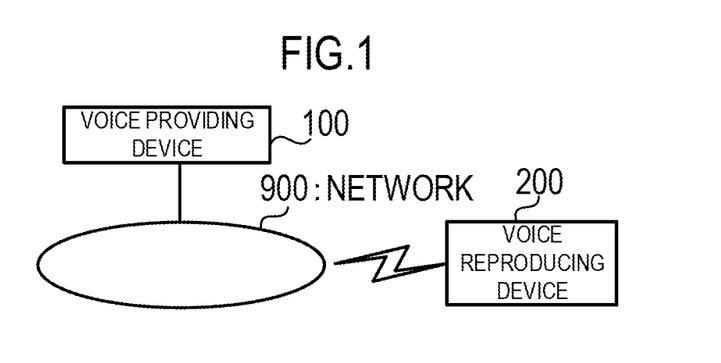
FIG. 1 is a diagram showing an entire configuration of a voice providing system according to a preferred embodiment of the present invention.

FIG. 1 is a diagram showing an entire configuration of a voice providing system being a preferred embodiment of the present invention. The voice providing system is provided in an area of a facility such as an amusement park, a play facility, an amusement facility, a public facility, a commercial facility, or an event venue facility, for example. In the voice providing system, an imaginary talker that dialogues and communicates with a user is defined in an arbitrary position in the area of a facility. The imaginary talker (hereinafter referred to as a virtual talker) herein, in a case in which the voice providing system is provided in an amusement facility, for example, is a fictional existence assumed as a talker that can have a dialogue with a human, such as a mascot or a character that symbolizes the amusement facility. In a case in which the virtual talker is present within a predetermined range from the user, the voice of the virtual talker is provided to the user. As a result, the user can feel as if the virtual talker is present near the self, and further have a dialogue with the virtual talker by issuing an utterance in person.

As shown in FIG. 1, the voice providing system includes a voice providing device 100 that provides voice, and a voice reproducing device 200 that reproduces provided voice. A network 900 is a wired or wireless communication network for performing data communication according to a predetermined telecommunication standard. The voice providing device 100 and the voice reproducing device 200 are connected so as to communicate with each other through the network 900, and exchange data via this network 900. It is to be noted that, although one voice providing device 100 and one voice reproducing device 200 are shown in FIG. 1, a plurality of voice providing devices and voice reproducing devices may be provided.

The voice reproducing device 200 is a wearable terminal that is used, for example, in a state of being attached to or carried by a user. Although the shape of the voice reproducing device 200 is arbitrary, the shape may be a glasses type, a hat type, a headband type, a headphone type, an ear muff type, or a hair band type that is attached to the head of a user, for example; may be an earphone type, a pierced earring type, or an earring type that is attached to the ear of a user; may be a necklace type that is hung on the neck of a user; may be a watch type, a wristband type, or an armband type that is attached to the wrist or arm of a user; may be a brooch type, an emblem type, or a similar type that is attached to the clothing or the like of a user; or may be a tablet type or a smartphone type that is carried by a user.

Figure 2:
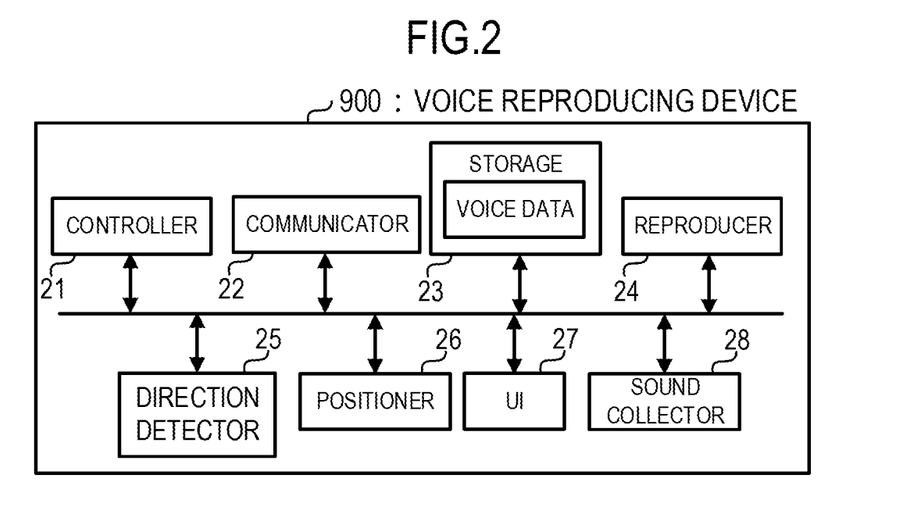
FIG. 2 is a block diagram showing a hardware configuration of a voice reproducing device in the voice providing system.

FIG. 2 is a block diagram showing a hardware configuration of the voice reproducing device 200. The voice reproducing device 200 includes a controller 21 that includes an arithmetic processing device such as a CPU (Central Processing Unit) and storage devices such as a ROM (Read Only Memory) and a RAM (Random Access Memory), for example; a communicator 22 that includes an antenna and a communication circuit, for example, and performs wireless communication through the network 900; a storage 23 that includes an EEPROM (Electrically Erasable and Programmable ROM) or a flash memory, for example; a reproducer 24 that includes a speaker, reproduces audio data, and outputs voice; a direction detector 25 that includes a direction sensor or a gyro sensor, for example, and detects a direction (herein, the direction of the voice reproducing device 200 is assumed to be a direction to which the user faces) to which the voice reproducing device 200 faces; a positioner 26 that performs positioning using a GPS (Global Positioning System), for example; and a UI (User Interface) 27 that includes an operator including a physical controller such as a key or a touch sensor, for example, and a display such as a liquid crystal panel or a liquid crystal drive circuit, for example; and a sound collector 28 that collects voice from a microphone.

The storage 23, while storing a data group and a program group that the controller 21 uses, stores a plurality of pieces of voice data that indicates the voice of a virtual talker, for example. The controller 21 reads out voice data designated from the voice providing device 100 through the communicator 22, from the storage 23, and reproduces the readout voice data by the reproducer 24. In addition, the controller 21 transmits voice data that indicates the voice of a user that has been collected by the sound collector 28, to the voice providing device 100 through the communicator 22. The voice providing device 100 designates voice data of the virtual talker corresponding to the voice data of this user to the voice reproducing device 200. The designated voice data is reproduced in the voice reproducing device 200. As a result, a two-way dialogue between the user and the virtual talker is achieved. It is to be noted that communication between a user and a virtual talker may not necessarily be limited to the two-way dialogue and may be a one-way dialogue from a virtual talker to a user, for example.

Figure 3:
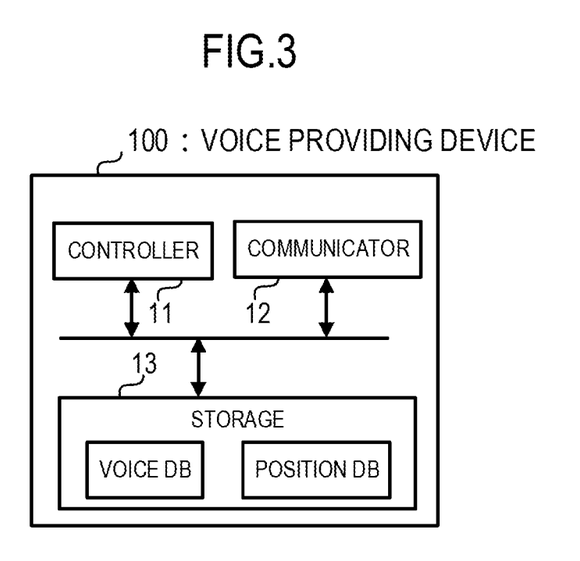
FIG. 3 is a block diagram showing a hardware configuration of a voice providing device in the voice providing system.

FIG. 3 is a block diagram showing a hardware configuration of the voice providing device 100. The voice providing device 100 is a computer such as a server machine, for example, and includes a controller 11, a communicator 12, and a storage 13. The controller 11 includes an arithmetic device such as a CPU, and storage devices such as a ROM and a RAM. The CPU, by using the RAM as a work area and executing a program stored in the ROM or the storage 13, controls the operations of various portions of the voice providing device 100. The communicator 12 is connected to the network 900 and performs communication through the network 900. The storage 13 is a storage device such as a hard disk, for example, and stores a data group or a program group that the controller 11 uses.

The storage 13, for example, stores a voice database (the database is hereinafter referred to as DB) including information (a voice ID to identify the voice data stored in the voice reproducing device 200, for example) relating to the voice data of a virtual talker or a voice interaction algorithm, and a position DB that manages the positions of a user and a virtual talker.

The voice interaction algorithm may be any algorithm as long as the algorithm is for recognizing the voice of a user and responding to the recognition result with voice, and, for example, an algorithm using the hidden Markov model or the like is known as a voice recognition algorithm.

Figure 4:
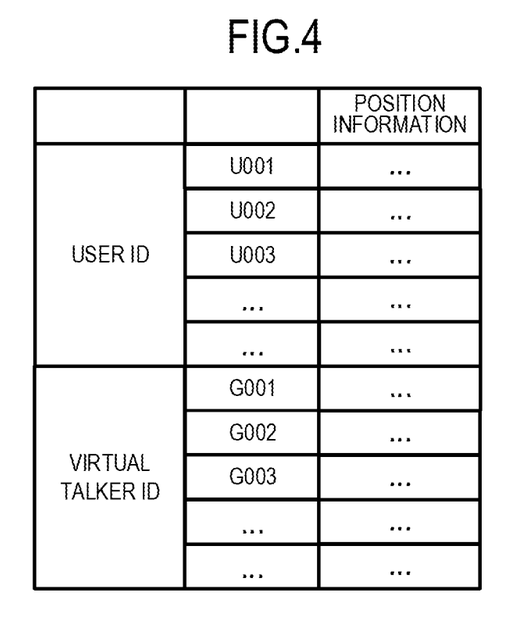
FIG. 4 is a diagram showing an example of a position DB stored in the voice providing device.

FIG. 4 is a diagram showing an example of the position DB. In the position DB, a user ID and a virtual talker ID being identification information of each of a user and a virtual talker, and position information that indicates a position of each of the user and the virtual talker are associated with each other. The position information (a first position) of the user is notified from the voice reproducing device 200 to the voice providing device 100, and the position of the user in the position DB is updated according to this notification. The position information (a second position) of the virtual talker may be a fixed position and may be a position that changes with time. In a case in which a position changes, according to a predetermined position change algorithm, the position of the virtual talker in the position DB is updated. The position change algorithm, while being any algorithm, may be an algorithm to select at random an arbitrary position in an area in which the voice providing system is installed or may be an algorithm to move a position in a predetermined route determined in the area in which the voice providing system is installed, by a predetermined distance, for example. The position change algorithm may be different for each virtual talker, and the position change algorithm of one virtual talker may be switched according to conditions such as time and date.

Figure 5:
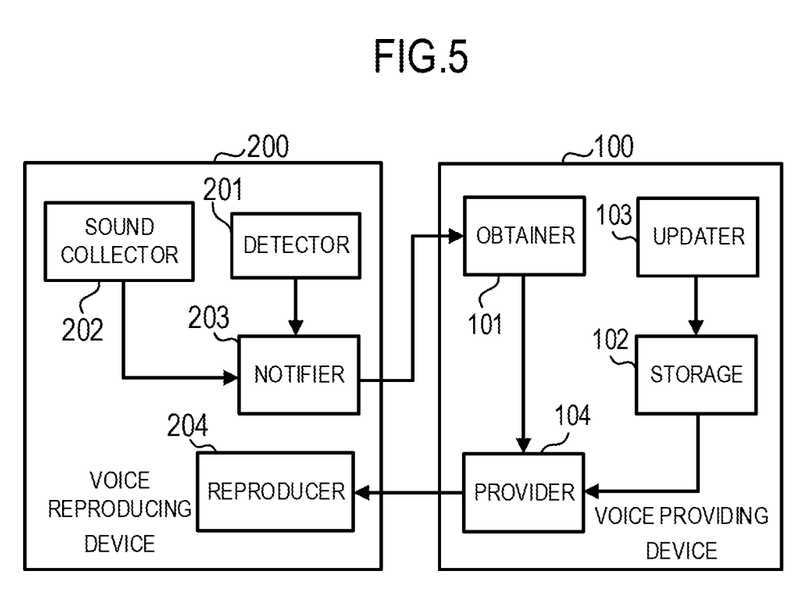
FIG. 5 is a block diagram showing a functional configuration of each device in the voice providing system.

FIG. 5 is a diagram showing a functional configuration of the voice reproducing device 200 and the voice providing device 100. A detector 201 of the voice reproducing device 200 detects a position of a user and a direction to which the user faces. A sound collector 202 of the voice reproducing device 200 collects voice, and generates voice data. A notifier 203 of the voice reproducing device 200 notifies the position of a user and the direction to which the user faces that have been detected by the detector 201 and the voice data that has been generated by the sound collector 202, to the voice providing device 100.

An obtainer 101 of the voice providing device 100 obtains the position of a user, the direction to which the user faces, and the voice data that have been notified from the notifier 203 of the voice reproducing device 200. A storage 102 of the voice providing device 100 stores the voice DB and the position DB described above. An updater 103 updates memory content (the content of the position DB, in particular) of the storage 102. A provider 104 of the voice providing device 100, in a case in which at least one of a position of a user and a position of a virtual talker is in a predetermined relationship, performs processing for providing the user with voice for the virtual talker to have a dialogue with the user with content according to the user. In the present preferred embodiment, the provider 104, in a case in which the position of a virtual talker is included within a range of 45 degrees on both sides of the direction to which the user faces, for example, and in a range in which a distance from the user is less than or equal to a threshold value, specifies appropriate voice data among the voice data group of the virtual talker based on the voice data of the user, and provides the user with voice by designating the specified voice data to the voice reproducing device 200. At this time, the provider 104 designates voice reproduction with sound volume according to the distance between the user and the virtual talker to the voice reproducing device 200.

A reproducer 204 of the voice reproducing device 200 reproduces the voice data designated from the voice providing device 100 with the designated sound volume, and outputs voice. The user listens to the voice to be reproduced from the voice reproducing device 200.

The detector 201 of the above described voice reproducing device 200 is achieved by the direction detector 25 and the positioner 26 shown in FIG. 2, the sound collector 202 is achieved by the sound collector 28, the notifier 203 is achieved by the communicator 22 shown in FIG. 2, and the reproducer 204 is achieved by the reproducer 24 shown in FIG. 2. The obtainer 101 of the voice providing device 100 is achieved by the communicator 12 shown in FIG. 3, the storage 102 is achieved by the storage 13 shown in FIG. 3, the updater 103 is achieved by the controller 11 shown in FIG. 3, and the provider 104 is achieved by the controller 11 and the communicator 12 shown in FIG. 3.

Operation

Next, the operation of the present preferred embodiment will be described with reference to FIG. 6. First, a user operates the voice reproducing device 200 and performs an operation for starting voice providing service. When the voice reproducing device 200 receives this operation, the sound collector 202 collects voice and generates voice data (Step S11). In this Step, in a case in which the user issues an utterance, the voice of the user is collected, and, in a case in which the user does not issue an utterance in particular, environmental sound such as background music, for example, is collected.

Subsequently, the detector 201 of the voice reproducing device 200 detects a position of the user and a direction to which the user faces (Step S12). As stated above, the position of the user herein is a position of the voice reproducing device 200, and the direction to which the user faces is a direction that the voice reproducing device 200 faces. The notifier 203 of the voice reproducing device 200 notifies the voice providing device 100 of the position of the user and the direction to which the user faces, and the voice data generated from collected voice, together with a user ID (Step S13). This user ID may be previously stored in the storage 23 or may be inputted to the voice reproducing device 200 when the user starts this voice providing service.

The obtainer 101 of the voice providing device 100 obtains the position of the user, the direction to which the user faces, the user ID, and the voice data that have been notified from the notifier 203 of the voice reproducing device 200. The provider 104, by referring to the position DB, extracts a virtual talker included in such a range that the positional relationship with the user may be in a predetermined positional relationship (Step S14). More specifically, the provider 104 determines whether or not the position of a virtual talker is included within a range of 45 degrees on both sides of the direction to which the user of the obtained user ID faces, for example, and in such a range that a distance from the user may be less than or equal to a threshold value.

Figure 7:
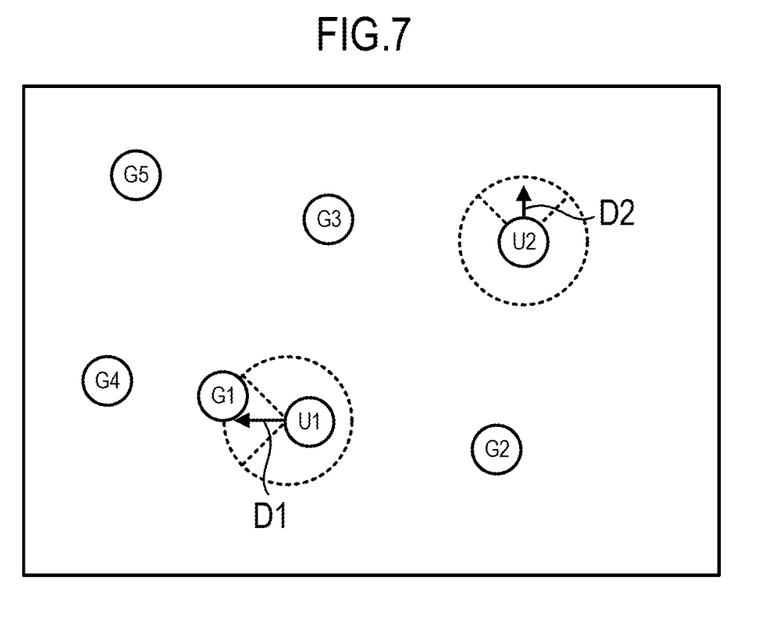
FIG. 7 is a schematic diagram showing an example of a positional relationship of a user and a virtual talker.

FIG. 7 is a schematic diagram showing an example of a positional relationship of a user and a virtual talker. In FIG. 7, the positions of users U1 and U2 and virtual talkers G1 to G5 are indicated on the two-dimensional plane, based on the content of the position DB. Directions D1 and D2 respectively indicate the directions to which the users U1 and U2 face. The users U1 and U2 move freely in the area in which the voice providing system is installed. Therefore, the positions and directions of the users U1 and U2 change irregularly. On the other hand, the positions of the virtual talkers G1 to G5, as stated above, may be positions that are fixed regardless of time or may be positions that change with time based on the position change algorithm. Therefore, at a certain timing, the users U1 and U2 and the virtual talkers G1 to G5 may be close to each other by chance, and, at a different timing, the users U1 and U2 and the virtual talkers G1 to G5 may be apart from each other.

For example, when the user U1 faces a direction D1, the position of the virtual talker G1 is included in a predetermined range (within a range of 45 degrees on both sides of a half line that indicates the direction D1 in FIG. 7) on the basis of a half line that indicates the direction D1. Accordingly, in such a case, the provider 104 determines that the position of the virtual talker G1 is included in the range in which the positional relationship with the user is in a predetermined positional relationship. On the other hand, when the user U2 faces a direction D2, for example, any of the positions of the virtual talkers is not included in the predetermined range on the basis of the half line that indicates the direction D2. Accordingly, in such a case, the provider 104 determines that no virtual talker is included in the range in which the positional relationship with the user is in the predetermined positional relationship.

Figure 6:
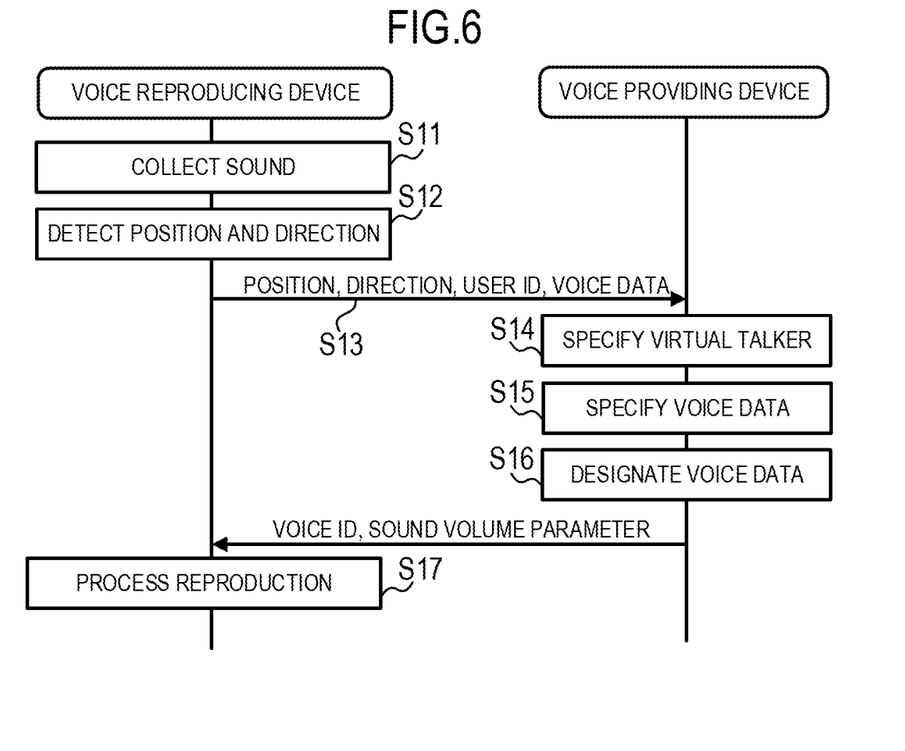
FIG. 6 is a flow chart showing an operation of the voice providing device.

Returning to the description of FIG. 6, the provider 104 specifies the voice data of the virtual talker that responds to the voice of the user according to the voice interaction algorithm based on the voice data of the user that has been obtained in Step S13 (Step S15). For example, when the obtained voice data is an utterance content of the user, such as "Hello. Is there anyone?," the voice data of the virtual talker to answer to the question of the user, such as "Yeah, I am here. Hello," is specified. In addition, when the obtained voice data is environmental sound such as background music, such voice data that the virtual talker may actively issue an utterance such as "Hello, may I help you?" to the user is specified.

Furthermore, the provider 104 calculates a distance between the position of the user and the position of the virtual talker, and sets a sound volume parameter of voice data to a value according to the distance. For example, the provider 104 performs a sound volume parameter setting to turn down the sound volume when the distance between the user and the virtual talker is large and turn up the sound volume when the distance between the user and the virtual talker is small.

The provider 104 transmits a voice ID and sound volume parameter of the voice data that has been specified in Step S15 to the voice reproducing device 200 through the network 900. As a result, the voice to be reproduced in the voice reproducing device 200 is designated (Step S16).

The reproducer 204 of the voice reproducing device 200 reads out the voice data of the voice ID designated from the provider 104, from the storage 23, and performs voice reproduction with the sound volume according to the sound volume parameter designated from the provider 104 (Step S17).

Hereinafter, the processing of the above Steps S11 to S17 is repeated, so that a two-way dialogue is made between the user and the virtual talker. As a result, the user can feel as if a virtual talker is present near the self, and further can sensuously know the distance from the self to the virtual talker by the magnitude of the sound volume.

With the above described preferred embodiment, it is possible to achieve new information providing service in which the position and direction of a user are associated with voice, that is, communication by voice between a virtual talker and a user. In addition, a voice providing side (an operator of an amusement facility, for example) can expect a customer attraction effect of attracting the user to the facility by voice provided to a user.

MODIFICATION EXAMPLES

The above described preferred embodiment is able to be modified as follows. In addition, the following modification examples may be combined and implemented.

Modification Example 1

A sound field in which the position of a virtual talker is set as a voice source on the basis of a user, may be reproduced. Specifically, the voice reproducing device 200 mounts a plurality of speakers and temporally delays timing to emit voice from each of the speakers, which makes it possible to achieve a sound field that enables sound image localization of from which direction the voice of the virtual talker is heard. The provider 104 of the voice providing device 100 provides the voice reproducing device 200 with a sound field parameter (specifically, delay time of the timing to emit voice from each speaker) for achieving the sound image localization according to the positional relationship between the user and the virtual talker. In other words, the provider 104 performs processing for providing a sound field for performing sound emitting processing of the voice according to the relationship between the position of the user and the position of the virtual talker, together with the voice of the virtual talker. In this manner, the user can feel in which direction the virtual talker is present.

Modification Example 2

Although, in the preferred embodiment, voice has been provided to a user by being emitted from the voice reproducing device 200 that is attached to each user or is carried by the user, a device to emit voice to a user is not limited to this example, and voice may be emitted to a user by a voice reproducing device such as a speaker placed in the area in which this voice providing system is installed, for example. Specifically, the above described voice reproducing device including a speaker, and a communication terminal that is attached to or carried by each user and having a function of the detector 201 are configured as separate devices, and this voice reproducing device and the communication terminal include a function of performing wireless data communication mutually. The communication terminal detects the position and direction (that is, the position of a user and the direction to which the user faces) of the self, and notifies the position and direction to a voice reproducing device (that is, a voice reproducing device near the user) with which the self is able to communicate. The voice reproducing device transmits the position and direction of the user that have been notified from the communication terminal, to the voice providing device 100. The voice providing device 100 specifies a virtual talker that is in a predetermined relationship with the position and direction of the user, and designates voice data for the virtual talker to have a dialogue with the user, to the above described voice reproducing device. The voice reproducing device reproduces designated voice data.

Modification Example 3

In the preferred embodiment, the provider 104 of the voice providing device 100 has provided voice in the case in which a user and a virtual talker are within a predetermined range and the virtual talker is present in the direction (the range of 45 degrees on both sides of the direction to which the user faces, for example) to which the user faces. However, the direction to which the user faces is not necessarily required as a condition to provide voice. In other words, the provider 104 may perform processing for providing voice in the case in which the distance between the position of a user and the position of a virtual talker are in a predetermined relationship.

Modification Example 4

Although, in the preferred embodiment, the provider 104 has performed the processing for providing voice for a virtual talker to have a dialogue with a user with content according to the user, the "content according to the user" herein means according to an utterance content of the user. This "content according to the user" may also include meaning such as an attribute, behavior, biological information, or feeling of the user, as described below.

The attribute of the user includes age, gender, interests, and preference of the user, for example. In such a case, the storage 102 of the voice providing device 100 stores association between the user ID being identification information that identifies each user and an attribute group of the user. The attribute group of the user has been registered or declared in advance by the user. The provider 104 specifies the voice data of the content according to the attribute of this user as voice data of a virtual talker. For example, when the interests of the user are sports, a sports-related topic is used as a topic of a dialogue between the user and the virtual talker.

In addition, the behavior of a user includes a motion and movement history of a user. In such a case, the voice reproducing device 200, as a sensor to detect the behavior of a user, includes a microphone, an acceleration sensor, a gyroscope sensor, and a positioner. The provider 104 specifies the voice of a virtual talker according to the movement history or motion of a user that are notified from the voice reproducing device 200.

As the movement history of a user, a position immediately before the voice of a virtual talker is specified or a history of changes in the position may be used, or a position in the past or changes (one hour before the voice of a virtual talker is specified or during the last visit to a facility, for example) in the position may be used. For example, in a case in which the position during the last visit to a facility is used, as the movement history in the previous entry to the facility, for example, a history that means a state in which a user approaches a boarding area of a roller coaster and then moves away from the boarding area without boarding the roller coaster is recorded, and, in the movement history during the entry to the facility this time, in a case in which the boarding of the roller coaster has been detected, the provider 104 provides the user with voice of the virtual talker such as "you could not make it before, but you made it!" In addition, as a behavior, when such an action that a user may shake the head, for example, is detected, the provider 104 provides the user with voice of a virtual talker, such as "do you have any trouble?"

In addition, the motion of a user includes any body motion of a user, such as a facial expression, body language, gesture, or action pattern of a user, for example. For example, motion data that indicates the motion of a user is obtained in Step S13 of FIG. 6, and the provider 104 specifies the voice data of a virtual talker to the user, based on the motion data in Step S15.

The biological information of a user includes body temperature, a pulse, perspiration, or brain waves of a user, for example. In such a case, the voice reproducing device 200 includes a sensor to detect the biological information of a user. The provider 104 specifies the voice of a virtual talker according to the biological information of a user that is notified from the voice reproducing device 200. In addition, the provider 104 may estimate feeling of a user based on the biological information and behavior of the user that are notified from the voice reproducing device 200, and may specify the voice of a virtual talker according to the feeling.

Modification Example 5

In the preferred embodiment, although, as the position change algorithm of a virtual talker that the updater 103 uses, the algorithm to select at random an arbitrary position in the area in which the voice providing system is installed or the algorithm to move a position in a predetermined route determined in the area in which the voice providing system is installed, by a predetermined distance are exemplified, the following is also considered in addition to these algorithms.

For example, the updater 103 updates the position of a virtual talker according to congestion status of each area, the congestion status being specified based on the number of visitors to a facility located in each area that is divided on a predetermined standard, for example. In a case of an amusement facility, the congestion status of each area is greatly different, depending on service status such as a popular attraction and a program. Then, the updater 103 employs a position change algorithm so as to detect the congestion degree of each area in the facility and to increase an appearance probability of a virtual talker in an area in which the congestion degree is less than a threshold value. In this manner, it becomes possible to guide a user to an area with less congestion, using the consciousness of the user who desires to communicate with a virtual talker.

In a case in which the congestion status of visitors to the facility is detected by a camera or the like that images the inside of the facility, for example, the congestion status of facility visitors who carry the voice reproducing device 200 and facility visitors who do not carry the voice reproducing device 200 is able to be specified. In addition, in a case in which the congestion status of visitors to the facility is detected based on results obtained by positioning by the positioner 26 of each voice reproducing device 200, for example, the congestion status of facility visitors who carry the voice reproducing device 200 is able to be specified. The facility visitors to be detected for the congestion status may be either of the above facility visitors.

In addition, the updater 103 employs a position change algorithm so as to store a schedule (the position and time when service is provided) of service such as an attraction or a program that may be provided to a plurality of users, and to increase the appearance probability of a virtual talker in an area and time when such service may be provided. In this manner, it becomes possible to guide a user to an area in which the service is provided, using the consciousness of the user who desires to communicate with a virtual talker.

In addition, even when there is no way to detect the congestion degree of each area in the facility, the updater 103 may employ a position change algorithm so as to store a schedule of service such as an attraction or a program that may be provided to a plurality of users, and to increase the appearance probability of a virtual talker in an area in which the congestion degree of each area to be estimated from the schedule is less than a threshold value. Even in this manner, it becomes possible to guide a user to an area with less congestion, using the consciousness of the user who desires to communicate with a virtual talker.

In addition, the updater 103, according to movement of a user who is having a dialogue with a virtual talker, updates the position of the virtual talker. In other words, it is such an algorithm that the virtual talker, following the movement of the user who has started a dialogue with the virtual talker, may make the same position change as the user. In this manner, the user can feel like the virtual talker is having a dialogue while walking together.

Modification Example 6

The provider 104, when specifying the voice data of a virtual talker, may perform processing not to specify the voice of one virtual talker but to specify the voice data of a plurality of virtual talkers in a predetermined relationship with the position of a user and to provide the user with all the data. In such a case, the provider 104, for example, may change the voice of the voice data for each virtual talker, or may control the sound volume of each voice according to the distance between the position of the user and the position of the virtual talker.

Modification Example 7

The communication between a user and a virtual talker in the present invention is not limited to a two-way dialogue and may be a one-way dialogue.

Modification Example 8

In the preferred embodiment, although the provider 104 controls the sound volume of the voice data based on the distance between the position of a virtual talker and the position of a user, the method of controlling the sound volume is not limited to this method. For example, the provider 104 provides a user with voice of the sound volume corresponding to the coincidence degree (proximity between the half line that indicates the direction to which the user faces with the position of the user as a starting point, and the position of a virtual talker, for example) between the direction to which the user faces on the basis of the position of the user, and the position of the virtual talker.

Furthermore, acoustic processing to change not only the sound volume of the voice data but also the tone and effect of the voice data or the like, in short, an acoustic parameter of the voice data, may be performed on the basis of the positional relationship between the virtual talker and the user. For example, the provider 104 may reduce (so as to reduce only a low-frequency sound component in a case in which the distance is large, for example) the low frequency range by an equalizer according to the distance between the virtual talker and the user, or varies (so as to increase the intensity of reverberation in a case in which the distance is large, for example) the intensity of effect such as delay or reverberation according to the distance between the virtual talker and the user.

In addition, as the position of the virtual talker, in addition to a position in the horizontal direction, a position in the height direction may be used. In such a case, the provider 104 may perform the acoustic processing on which the position of the virtual talker in the height direction has been reflected, to the voice data. The provider 104, in a case in which the position of the virtual talker is higher than the position of the user, for example, may apply such an effect the voice of the virtual talker could be heard from above the user by processing using a head-related transfer function (HRTF: Head-Related Transfer Function).

Modification Example 9

In the preferred embodiment, although the provider 104 controls the sound volume of the voice data based on the distance between the position of a virtual talker and the position of a user, the content of the voice data may be changed. For example, the provider 104, in a case in which the position of the virtual talker is included within the range of 45 degrees on both sides of the direction to which the user faces and in the range in which the distance from the user is not less than a first threshold value, for example, provides the voice data such as "Hey, over here;" in a case in which the position of the virtual talker is included within the range of 45 degrees on the both sides of the direction to which the user faces and in the range in which the distance from the user is more than a second threshold value and is less than the first threshold value, for example, provides the voice data such as "This way;" and, in a case in which the position of the virtual talker is included within the range of 45 degrees on the both sides of the direction to which the user faces and in the range in which the distance from the user is not more than the second threshold value, for example, provides the voice data such as "Hello." In the preferred embodiment, the second threshold value is smaller than the first threshold value.

It is to be noted that the provider 104 may change both the sound volume and content of voice data, based on the distance between the position of a virtual talker and the position of a user.

Modification Example 10

In the preferred embodiment, although the direction detector 25 that detects a direction to which a user faces includes a direction sensor and a gyro sensor, the direction to which the user faces may be detected by use of a beacon transmitter. Specifically, the direction detector 25 may include a receiver that receives a signal from a previously installed beacon transmitter.

For example, a plurality of beacon transmitters are previously installed in different positions from each other, and the direction detector 25 detects a direction to which the user faces by receiving a beacon signal from the plurality of beacon transmitters by the receiver, and using a technique such as triangulation.

Alternatively, one beacon transmitter may be previously installed so as to guide a user to a predetermined range. In such a case, the direction of the beacon transmitter is detected by the beacon signal, and the direction to which the user faces is detected, based on the direction of the beacon transmitter. A method of guiding a user to the predetermined range includes marking on the ground or providing a real or virtual wall, for example. The method of guiding a user is not limited to the above, and only has to be able to guide a user to the predetermined range and restrict the position of the user in the predetermined range. In addition, the beacon transmitter or the receiver may be operated only when a user enters the predetermined range.

Modification Example 11

The voice with which a user is provided is not limited to the voice that has been previously stored in the storage 23 of the voice reproducing device 200 and may be stored in the storage 13 of the voice providing device 100. In such a case, the voice data may be provided from the voice providing device 100 to the voice reproducing device 200 each time, for example, at a timing of executing Step S16 of FIG. 6. In addition, the provider 104, in addition to voice, may provide the voice reproducing device 200 with data (text data that describes in-facility information about a position of the user or image data that indicates an image relevant to the position, for example) other than the voice about the position of the user.

Modification Example 12

The block diagram of FIG. 5 used to describe the above preferred embodiment shows blocks of functional units. Each of these functional blocks is achieved by arbitrarily combining hardware and/or software. Furthermore, each functional block is not particularly limited to how to be achieved. In other words, each functional block may be achieved by one physically and/or logically combined device or may be achieved by a plurality of devices configured by two or more physically and/or logically separated devices that are directly and/or indirectly (by wire and/or wirelessly, for example) connected. Accordingly, the voice providing device or the voice reproducing device according to the present invention is also able to be achieved by a device integrally including all the respective functions described in the preferred embodiment or may be a system in which the functions of each device are further divided and mounted into a plurality of devices. In addition, the order of the steps of the processing described in the above described preferred embodiment may be changed as long as no contradiction occurs. In the method described in the preferred embodiment, the elements of the respective steps are presented in an exemplary order, and the order is not limited to the presented specific order.

The present invention is also able to be achieved in a form such as an information processing method performed by the voice providing device or the voice reproducing device. In addition, the present invention is also able to be achieved in a form such as a program for causing a computer to function as the voice providing device or the voice reproducing device. Such a program is able to be provided in a form of being recorded in a recording medium such as an optical disc or provided in a form of being downloaded to a computer via a communication network such as the internet and installed to make available.

The descriptions of the present preferred embodiments that have been described above are illustrative in all points and should not be construed to limit the present invention. The scope of the present invention is shown not by the foregoing preferred embodiments but by the following claims. Further, the scope of the present invention is intended to include all modifications within the scopes of the claims and within the meanings and scopes of equivalents.

What is claimed is:

1. A voice providing device comprising:
   an obtainer to obtain position information from a voice reproducing device;
   a provider, in a case in which a first position of the position information obtained by the obtainer and a second position of a virtual talker are in a predetermined relationship, to perform processing to cause the voice reproducing device to reproduce voice for the virtual talker to have a dialogue with a user with content according to the user; and
   an updater to update the second position, wherein:
   the voice providing device is used in a plurality of areas each having a congestion status and being divided on a predetermined standard;
   the updater detects the congestion status of each area among the plurality of areas; and
   the updater updates the second position according to the congestion status of each area.

2. The voice providing device according to claim 1, wherein the provider causes the voice reproducing device to reproduce, along with reproduction of the voice, a predetermined sound field according to a relationship between the first position and the second position.

3. The voice providing device according to claim 1, wherein the provider performs processing to reproduce the voice in a case in which the first position and the second position are within a predetermined range.

4. The voice providing device according to claim 3, wherein the provider performs processing to reproduce the voice in a case in which the first position and the second position are within a range of a predetermined distance and the position of the virtual talker is present in a direction to which the user faces.

5. The voice providing device according to claim 3, wherein the provider performs processing to change the content of the voice according to a distance between the first position and the second position.

6. The voice providing device according to claim 1, wherein the provider performs processing to reproduce the voice for the virtual talker to have a dialogue with the user with content according to an attribute, behavior, biological information, or feeling of the user.

7. The voice providing device according to claim 1, wherein
   the plurality of areas each having a specific service;
   the updater stores a schedule that is a position and time when the specific service is provided; and
   the updater updates the second position according to status of the schedule of each area among the plurality of areas.

8. The voice providing device according to claim 1, wherein the updater updates the second position according to movement status of the user who is having a dialogue with the virtual talker.

9. A voice providing method comprising:
   obtaining position information from a voice reproducing device; and
   performing processing, in a case in which a first position of obtained position information and a second position of a virtual talker are in a predetermined relationship, to cause the voice reproducing device to reproduce voice for the virtual talker to have a dialogue with a user with content according to the user; and
   updating the second position, wherein:
   the voice providing method is used in a plurality of areas each having a congestion status and being divided on a predetermined standard;
   the updating detects the congestion status of each area among the plurality of areas; and
   the updating updates the second position according to the congestion status of each area.

10. The voice providing method according to claim 9, wherein the performing includes performing processing to cause the voice reproducing device to reproduce, along with reproduction of the voice, a predetermined sound field according to a relationship between the first position and the second position.

11. The voice providing method according to claim 9, wherein the performing includes performing processing to reproduce the voice in a case in which the first position and the second position are within a predetermined range.

12. The voice providing method according to claim 11, wherein the processing includes performing processing to reproduce the voice in a case in which the first position and the second position are within a range of a predetermined distance and the position of the virtual talker is present in a direction to which the user faces.

13. The voice providing method according to claim 11, wherein the processing includes performing processing to change the content of the voice according to a distance between the first position and the second position.

14. The voice providing method according to claim 9, wherein the processing includes performing processing to reproduce the voice for the virtual talker to have a dialogue with the user with content according to an attribute, behavior, biological information, or feeling of the user.

15. The voice providing method according to claim 9, wherein the updating includes updating the second position according to movement status of the user who is having a dialogue with the virtual talker.

16. A voice providing method comprising:
    obtaining position information from a voice reproducing device;
    performing processing, in a case in which a first position of obtained position information and a second position of a virtual talker are in a predetermined relationship, to cause the voice reproducing device to reproduce voice for the virtual talker to have a dialogue with a user with content according to the user; and
    updating the second position, wherein:
    the voice providing method is used in a plurality of areas, each of which is provided with a specific service and divided on a predetermined standard;

the updating stores a schedule that is a position and time when the specific service is provided; and the updating updates the second position according to the schedule of each area among the plurality of areas.

* * * * *